United States Patent
Shi et al.

(10) Patent No.: US 8,254,235 B2
(45) Date of Patent: Aug. 28, 2012

(54) SYSTEM AND METHOD FOR TRANSFER OF DATA STORED IN HOLOGRAPHIC STORAGE MEDIUM

(75) Inventors: Xiaolei Shi, Niskayuna, NY (US); John Erik Hershey, Ballston Lake, NY (US); John Anderson Fergus Ross, Niskayuna, NY (US); Brian Lee Lawrence, Waunakee, WI (US); Xuefeng Wang, Niskayuna, NY (US); Victor Petrovich Ostroverkhov, Ballston Lake, NY (US); Erik Solhjell, Oslo (NO); Rolf Jahren, Oslo (NO)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/751,755

(22) Filed: Mar. 31, 2010

(65) Prior Publication Data

US 2011/0242958 A1     Oct. 6, 2011

(51) Int. Cl.
*G11B 7/00*     (2006.01)
(52) U.S. Cl. ........................................ 369/103
(58) Field of Classification Search .................. 369/103, 369/112.01, 112.03, 112.23
See application file for complete search history.

(56) References Cited

U.S. PATENT DOCUMENTS

| | | | |
|---|---|---|---|
| 5,761,166 A | 6/1998 | Sedlmayr et al. | |
| 6,026,053 A * | 2/2000 | Satorius | 365/235 |
| 6,064,529 A * | 5/2000 | McDonald et al. | 359/637 |
| 6,322,933 B1 * | 11/2001 | Daiber et al. | 430/2 |
| 6,583,397 B2 | 6/2003 | Vo-Dinh | |
| 7,200,097 B2 | 4/2007 | Meyrueis et al. | |
| 2004/0175157 A1 | 9/2004 | Johnson | |
| 2006/0140102 A1 | 6/2006 | Sigel et al. | |
| 2007/0036039 A1 * | 2/2007 | Kawahara et al. | 369/13.01 |
| 2007/0086309 A1 | 4/2007 | Yang | |
| 2009/0003153 A1 | 1/2009 | Yamatsu | |
| 2009/0080317 A1 | 3/2009 | Martinez | |
| 2010/0008206 A1 * | 1/2010 | Jeong | 369/103 |
| 2010/0053710 A1 | 3/2010 | Bae et al. | |
| 2010/0110846 A1 * | 5/2010 | Park et al. | 369/44.23 |
| 2010/0165825 A1 * | 7/2010 | Saito et al. | 369/121 |
| 2011/0096653 A1 * | 4/2011 | Mizuyama et al. | 369/103 |
| 2011/0170391 A1 * | 7/2011 | Ross et al. | 369/53.26 |

FOREIGN PATENT DOCUMENTS

| | | |
|---|---|---|
| JP | 2008305509 A | 12/2008 |
| WO | 9609624 A1 | 3/1996 |

OTHER PUBLICATIONS

Philippe J. Marchand & Pierre Ambs; "Developing a Parallel-Readout Optical-Disk System"; IEEE Micro, Dec. 1994, vol. 14 Issue: 6 on pp. 20-27.

Search Report from corresponding EP Application No. 11159672.2-2210 mailed on Jul. 21, 2011.

* cited by examiner

*Primary Examiner* — Thang Tran
*Assistant Examiner* — Brenda Bernardi
(74) *Attorney, Agent, or Firm* — Joseph J. Christian

(57) ABSTRACT

A system for processing information is provided. The system includes multiple micro-holograms contained in multiple volumes arranged along multiple tracks in one or more storage mediums. Each of the micro-hologram includes a data. The system also includes one or more pick-up head devices with optical lenses for directing laser beams on the multiple tracks. Further, the system includes a subsystem for arranging the one or more pick-up head devices for recording and retrieving of the data from the one or more storage mediums.

30 Claims, 4 Drawing Sheets

SYSTEM AND METHOD FOR TRANSFER OF DATA STORED IN HOLOGRAPHIC STORAGE MEDIUM

BACKGROUND

The invention relates generally to data transfer systems and methods, more particularly to optical based systems and methods for transfer of data stored in a holographic storage medium.

Generally, a data storage system such as an optical storage system is implemented with an optical pick-up head for recording and retrieving of data. Such optical storage system may include an optical disc that includes data recorded along or between spiral or circular tracks having a series of spatially separated marks. The length of an interval between the marks is typically used to encode the data. During readout, the pick-up head focuses a laser beam, which laser beam is reflected off of the optical disc. As the disc is rotated, the reflected beam is modulated due to the difference in reflectivity from the marks to the alternating intervals between the marks. Further, the data is retrieved by detecting and decoding the modulated reflected signal. The processing of the data is enhanced by increasing the rotational speed of the disc. However, the speed of rotation of the disc is limited to avoid breakdown. Moreover, an optical storage medium having holographic data may require enhanced data transfer rates for archival application and even for consumer applications as well.

Therefore, there is a need for an efficient system and method for enhancing transfer rate of data stored in a holographic storage medium.

BRIEF DESCRIPTION

In accordance with an embodiment of the invention, a system for processing information is provided. The system includes multiple micro-holograms contained in multiple volumes arranged along multiple tracks in one or more storage mediums. Each of the micro-hologram includes a data. The system also includes one or more pick-up head devices with optical lenses for directing laser beams on the multiple tracks. Further, the system includes a subsystem for arranging the one or more pick-up head devices for recording and retrieving of the data from the one or more storage mediums.

In accordance with another embodiment of the invention, a method for recording and retrieving information is provided. The method includes providing multiple micro-holograms contained in multiple volumes arranged along multiple tracks in a holographic storage medium. The method also includes directing a multiple laser beams onto the multiple tracks using one or more pick up devices with optical lenses. Further, the method includes tracking and transferring of the data from the holographic storage medium.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards data transfer systems and methods. As used herein, the term 'holographic' or 'holography' refers to a technique that allows light scattered from an object to be recorded and later reconstructed so that the holography appears as if the object is in the same position relative to a recording medium when the object was recorded. The present invention addresses a technique of transferring data stored in a high-density holographic storage medium using optical based systems and methods.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
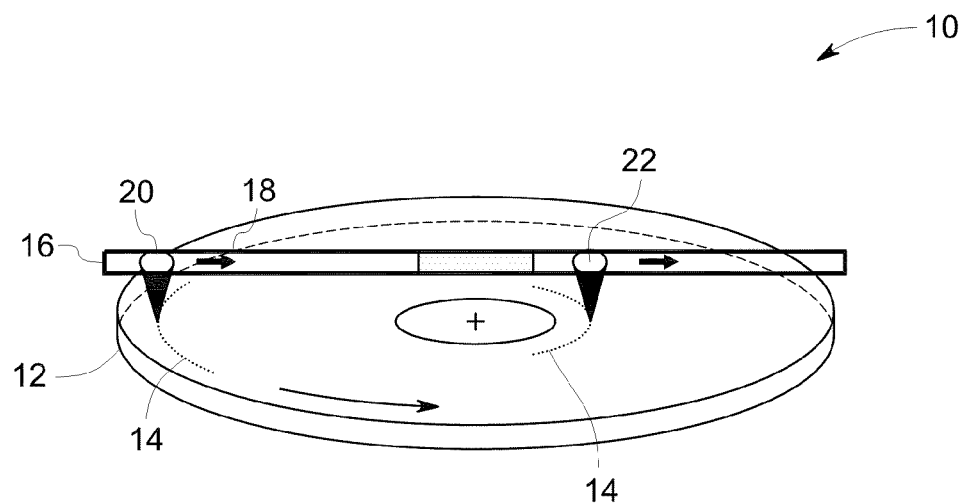
FIG. 1 is a system for processing information of a storage medium using two pick-up head devices in accordance with an embodiment of the present invention.

FIG. 1 illustrates a system 10 for processing information of a storage medium 12 in accordance with one embodiment of the present invention. In one embodiment, as shown, the storage medium 12 is a circular disc shaped holographic data storage device. In a non-limiting example, the storage medium 12 includes a plastic substrate having multiple volumes arranged along multiple data tracks 14 in multiple vertically stacked, laterally extending layers; and multiple micro-holograms each contained in a corresponding one of the volumes. The presence or absence of a micro-hologram in each of the volumes is indicative of a corresponding portion of data stored. The system 10 includes a subsystem 16, which subsystem 16 is adapted to transfer data from the storage medium 12 at a high rate. In one embodiment, the subsystem further includes a slider bar 18 that facilitates a radial movement of a pick-up head device for recording and retrieving of the data from the storage medium 12. As illustrated in this embodiment, the subsystem 16 having the slider bar 18 includes two pick-up head devices 20, 22. In this embodiment, the pick-up head device 20 is configured to move in a radial direction from the periphery of the storage medium 12 to the center of the storage medium 12. On the other hand, the pick-up head device 22 is configured to move radially from the center to the periphery of the storage medium 12. However, it is to be understood that various equivalent techniques for pick-up head movement can be mixed and matched by one of ordinary skill in this art to construct additional systems and techniques in accordance with principles of this disclosure. Further, the pick-up head devices 20, 22 includes optical lenses for directing laser beams onto the multiple data racks 14. In one embodiment, the subsystem 16 may include more than two multiple pick-up head devices.

Furthermore, the subsystem 16 allows parallel movement of the pick-up head devices 20, 22 for obtaining a constant data transfer rate while maintaining a constant angular velocity of rotation of the storage medium 12. As the storage medium 12 spins, both the pick-up head devices 20, 22 perform the operation of recording or reading the data from the multiple data tracks 14 on the storage medium 12. In one embodiment, one of the pick-up head devices writes data while the other pick-up device verifies the immediate recorded data. In one embodiment, the data transfer rates from the two pick-up head devices 20, 22 may be different depending on the position of the pick-up head devices 20, 22 radially on the storage medium 12. However, the system 10 maintains an overall constant data transfer rate by combining the data transfer rates of the two pick-up head devices 20, 22 accordingly. This constant data transfer rate is advantageous as the storage medium 12 can be rotated at a maximum constant speed, thereby, allowing the system 10 to maintain a constant data transfer rate. In one embodiment, the constant data transfer rate of the system 10 will generally be $(R_I+R_O)/R_I$ times higher than a system operating with a single pick-up head device, where $R_I$ and $R_O$ is the inner and outer recording radius respectively. In another embodiment, the constant data transfer rate of the system 10 will be about three and half times more than a system operating with a single pick-up head device. In such a system having a single pick-up head device, the rotation of the storage medium is varied depending on the radial position of the pick-up head device during readout or recording, which results in low data transfer rates.

Figure 2:
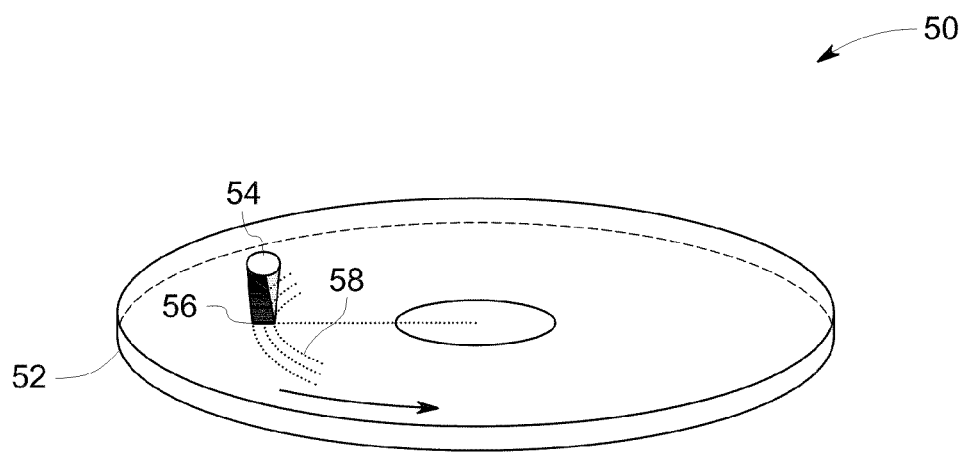
FIG. 2 is a system for processing information of a storage medium using an optical pick-up head device having a cylindrical lens in accordance with another embodiment of the present invention.

FIG. 2 illustrates a system 50 for processing information of a storage medium 52 in accordance with one embodiment of the present invention. As shown, the system 50 includes an optical pick-up head device 54. In one embodiment, the optical pick-up head device 54 is arranged along a slider bar (not shown) for radial movement on the storage medium 52. It is to be understood that various equivalent techniques for pick-up head movement can be mixed and matched by one of ordinary skill in this art to construct additional systems and techniques in accordance with principles of this disclosure. In one embodiment as shown, the storage medium 52 may be a circular disc shaped holographic storage medium having multiple parallel data tracks 58 with multiple volumes containing micro-holograms. The multiple volumes are arranged along the multiple parallel data tracks 58 in multiple vertically stacked, laterally extending layers of the holographic storage medium. The presence or absence of a micro-hologram in each of the volumes is indicative of a corresponding portion of data stored. As illustrated in one embodiment, the optical pick-up head device 54 includes a cylindrical lens that directs a laser beam to a line focus 56 for recording and retrieving data from the multiple parallel data tracks 58 of the storage medium 52. The line focus 56 enables readout of multiple adjacent data tracks simultaneously during operation of the system 50. In one embodiment, the line focus 56 may cover about three to about eight data tracks 58. Since track pitch for high-density storage such as the holographic storage medium 52 is small, the data transfer rates during readout of multiple parallel data tracks 58 can be made about the same. In one embodiment, the track pitch for high density storage such as the holographic storage medium 52 is less than 0.001% of the typical recording radius. Therefore the data transfer rates during recording and readout of the multiple parallel data tracks 58 can be made the same. Further, it is to be noted that for adjacent tracks, the radius are almost the same, therefore, the data rate is the same. Accordingly, the data transfer rate is improved by a factor equal to the number of multiple parallel data tracks 58 covered by the line focus 56 in this embodiment.

Furthermore, in the present embodiment as shown in FIG. 2, the storage medium 52 in the form of the circular disc shaped holographic storage medium includes formatting of the multiple parallel data tracks 58 such that the multiple data tracks are grouped and spiral out together. Since, the present embodiment includes a single pick-up head device 54, the rotation speed of the storage medium 52 is configured to vary during readout for maintaining constant data transfer rate as the pick-up head device 54 moves radially from the centre to the periphery of the storage medium 52. The speed of rotating storage medium 52 is generally high when the pick-up head device 54 is positioned towards the centre of the rotating storage medium 52 and low when the pick-up head device 54 is positioned towards the periphery of the storage medium 52. This is due to the amount of data stored in the inner radius is less compared to the amount of data stored in the outer periphery of the storage medium. In a preferred embodiment, a multiple pixel detector is used to match the multiple parallel data tracks 58 of the storage medium 52. The multiple pixel detector has multiple pixels. Each pixel, for example, read a single track of the multiple parallel tracks. The number of pixels in the detector matches the number of data tracks.

Figure 3:
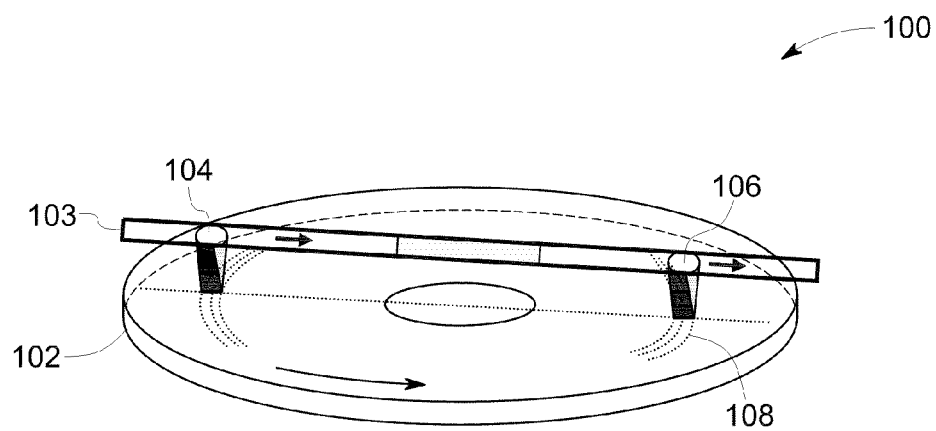
FIG. 3 is a system for processing information of a storage medium using multiple pick-up head devices having cylindrical lenses in accordance with another embodiment of the present invention.

FIG. 3 illustrates a system 100 for processing information of a storage medium 102 in accordance with an embodiment of the present invention. The system 100 includes two optical pick-up head devices 104, 106, which pick-up head devices are arranged along a slider bar 103 for radial movement on the storage medium 102. It is to be understood that various equivalent techniques for pick-up head movement can be mixed and matched by one of ordinary skill in this art to construct additional systems and techniques in accordance with principles of this disclosure. The storage medium 102 may be a circular disc shaped holographic storage medium having multiple parallel data tracks 108 with multiple volumes containing micro-holograms. The multiple volumes are arranged along the multiple parallel data tracks 108 in multiple vertically stacked, laterally extending layers of the holographic storage medium, wherein the presence or absence of a micro-hologram in each of the volumes is indicative of a corresponding portion of data stored. As shown, the optical pick-up head devices 104, 106 includes cylindrical lenses for directing a laser beam to a line focus onto multiple parallel data tracks 108 for readout. The line focus enables readout of multiple adjacent data tracks simultaneously during operation of the system 100. In one embodiment, the line focus may cover about three to about eight data tracks. The movement and data processing methodology of the dual pick-up head devices 104, 106 of the present embodiment, may be similar in approach to the embodiment as described with respect to FIG. 1. This enables the system 100 to an improved data transfer rate by a factor equal to the number of data tracks covered by the line focus multiplied by a factor of about three and half times due to the presence of dual pick-up head devices. The data storage medium 102 is further configured to rotate at a constant speed. Furthermore, the storage medium 102 employs formatting of the multiple parallel data tracks 108 such that the multiple data tracks are grouped together and spiral out together.

Figure 4:
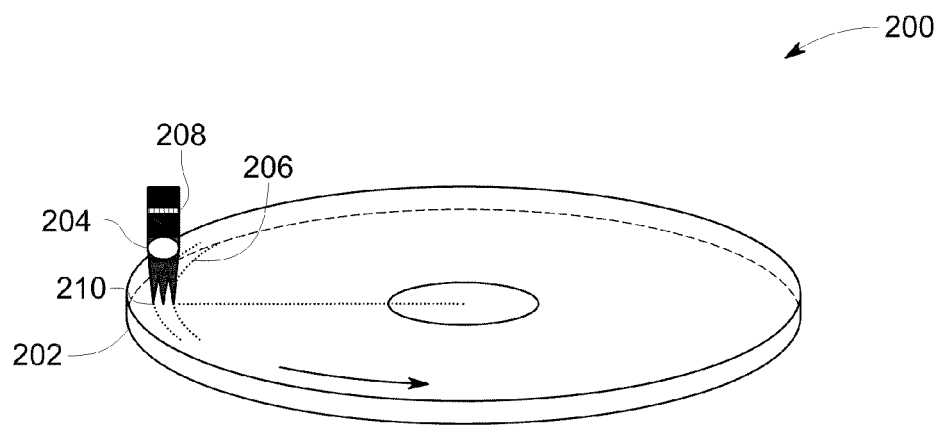
FIG. 4 is a system for processing information of a storage medium using an optical pick-up head device having a grating in accordance with another embodiment of the present invention.

FIG. 4 illustrates a system 200 for processing information of a storage medium 202 in accordance with an embodiment of the present invention. The system 200 includes an optical pick-up head device 204. In one embodiment, the optical pick-up head device 204 is arranged along a slider bar (not shown) for radial movement on the storage medium 202 during readout and recording of data. It is to be understood that various equivalent techniques for the optical pick-up head movement can be mixed and matched by one of ordinary skill in this art to construct additional systems and techniques in accordance with principles of this disclosure. The storage medium 202 may be a circular disc shaped holographic storage medium having multiple parallel data tracks 206 with multiple volumes containing micro-holograms. The multiple volumes are arranged along the multiple parallel data tracks 206 in multiple vertically stacked, laterally extending layers of the holographic storage medium, wherein the presence or absence of a micro-hologram in each of the volumes is indicative of a corresponding portion of data stored. As illustrated, the optical pick-up head device 204 includes an optical lens along with a grating structure 208. The grating structure 208 is a diffractive grating structure. Thereby, the grating structure 208 causes diffraction of the laser beam into multiple focal points 210 onto the multiple parallel data tracks 206 of the storage medium 202. This results in processing information of multiple parallel data tracks 206 of the storage medium 202. The processing of the information may include recording and retrieving data onto the multiple data tracks 206. In one embodiment, the multiple focal points 210 covers adjacent multiple data tracks 206 of the storage medium 202. In another embodiment, the multiple focal points 210 covers data tracks located at different positions of the storage medium 202.

Figure 5:
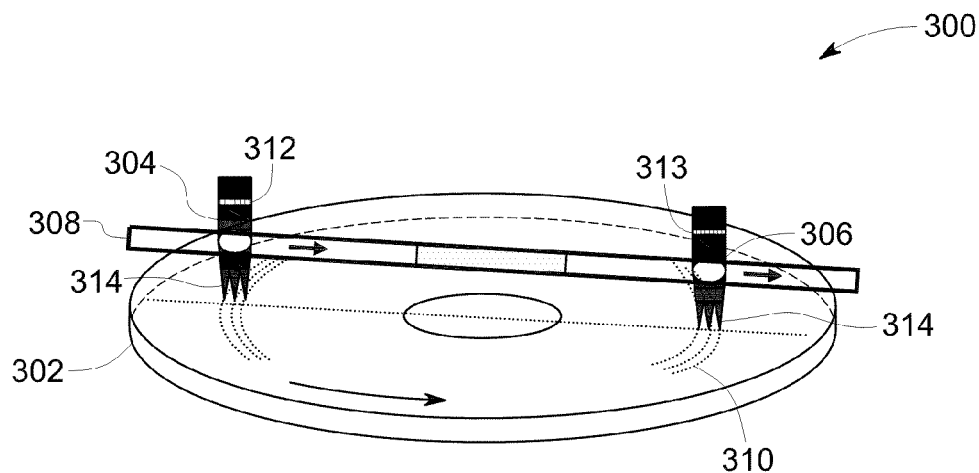
FIG. 5 is a system for processing information of a storage medium using multiple optical pick-up head devices having a grating in accordance with yet another embodiment of the present invention.

Furthermore, in the present embodiment the rotation speed of the storage medium 102 is configured to vary for maintaining constant data transfer rate when the pick-up head device 204 moves radially from the centre to the periphery of the storage medium 202 during readout and recording. The speed of rotating storage medium 202 is generally high when the pick-up head device 204 is positioned towards the centre of the rotating storage medium 202 and low when the pick-up head device 204 is positioned towards the periphery of the storage medium 202. In a preferred embodiment, a multiple pixel detection is used to match the multiple parallel data tracks 206 of the storage medium 202. The multiple pixel detector has multiple pixels. Each pixel, for example, read a single track of the multiple parallel tracks. The number of pixels in the detector matches the number of data tracks FIG. 5 is a system 300 for processing information of a storage medium 302 in accordance with yet another embodiment of the present invention. The system 300 includes two optical pick-up head devices 304, 306, which pick-up head devices are arranged along a slider bar 308 for radial movement on the storage medium 302. It is to be understood that various equivalent techniques for pick-up head movement can be mixed and matched by one of ordinary skill in this art to construct additional systems and techniques in accordance with principles of this disclosure. The storage medium 302 may be a circular disc shaped holographic storage medium having multiple parallel data tracks 310 with multiple volumes containing micro-holograms. The multiple volumes are arranged along the multiple parallel data tracks 310 in multiple vertically stacked, laterally extending layers of the holographic storage medium. The presence or absence of a micro-hologram in each of the volumes is indicative of a corresponding portion of data stored.

As shown in FIG. 5, the optical pick-up head devices 304, 306 includes optical lenses along with diffraction gratings 312, 313 for directing a laser beam onto the multiple parallel data tracks 310 by splitting and diffracting the laser beam into multiple focal points 314 for readout and recording purposes. The multiple focal points 314 enables readout and recording of multiple adjacent data tracks simultaneously during operation of the system 300. In one embodiment, the multiple focal points 314 of each of the pick-up head may cover about three to about eight data tracks. The operation of the dual pick-up head devices of the present embodiment, may be similar in approach to the embodiment as described with respect to FIG. 1 and FIG. 3. This enables the system 300 to an improved data transfer rate by a factor equal to the number of data tracks covered by the multiple focal points multiplied by a factor of about three and half times due to the presence of dual pick-up head devices. Further, the storage medium 302 is configured to rotate at a constant speed. Furthermore, the storage medium 302 employs formatting of the multiple parallel data tracks 310 such that the multiple data tracks are grouped together and spiral out together in case of the circular disc shaped holographic storage medium.

Figure 6:
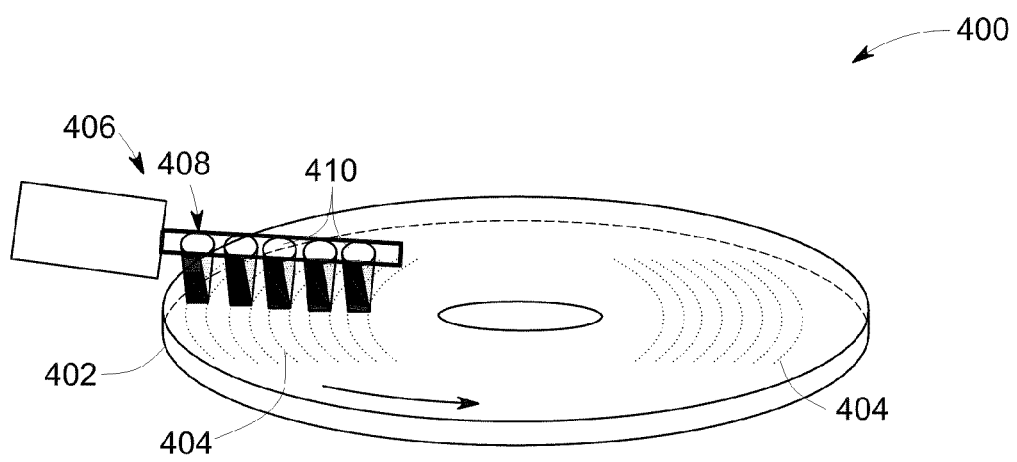
FIG. 6 is a system for processing information of a storage medium having multiple pick-up head devices arranged in an optical pick-up bar in accordance with another embodiment of the present invention.

FIG. 6 is a system 400 for processing information of a storage medium 402 in accordance with one embodiment of the present invention. The storage medium 402 is a circular disc shaped holographic data storage device having a plastic substrate including multiple volumes arranged along multiple tracks 404 in multiple vertically stacked, laterally extending layers; and multiple micro-holograms each contained in a corresponding one of the volumes. The presence or absence of a micro-hologram in each of the volumes is indicative of a corresponding portion of data stored. The system 400 includes a subsystem 406 having an optical pick-up bar 408, which optical pick-up bar 408 further includes an assembly of multiple optical pick-up head devices 410 for recording and retrieving of the data from the storage medium 402.

As shown, the multiple optical pick-up head devices 410 are radially placed on the optical pick-up bar 408. In one embodiment, each of the optical pick-up head devices 410 may include optical lens for focussing on a spot for readout or recording of a data track 404 of the storage medium 402. In another embodiment, the multiple optical pick-up head devices 410 may include cylindrical lenses for a directing a laser beam to a line focus onto multiple parallel data tracks 404 for readout or recording of data of the storage medium 402. Further, in another embodiment, the multiple pick-up head devices 410 includes optical lenses along with grating structures for diffracting of the laser beam into multiple focal points onto the multiple data tracks 404 of the storage medium 402. Each of the pick-up head device 410, thereby, accesses multiple data tracks 404 within a tracking actuator range with sufficient speed and accuracy. The directing of the laser beam into line focus or multiple focal points also allows a second level of parallelism. It is to be understood that in the present embodiment, two levels of parallelism are discussed. This includes the arrangement of parallel heads as a first level of parallelism and the second level of parallelism includes the parallel channels in each of the heads. Further, each pick-up head device 410 can be individually controlled to focus or track or tilt to accommodate any non-uniformity of the storage medium 402 or any vibration or wobbling effect of the rotating storage medium 402. Thus, the multiple pick up head devices 410 of the subsystem 406 enables the processing of the information such as readout or recording of data at a high rate as compared to a conventional data transfer systems.

Figure 7:
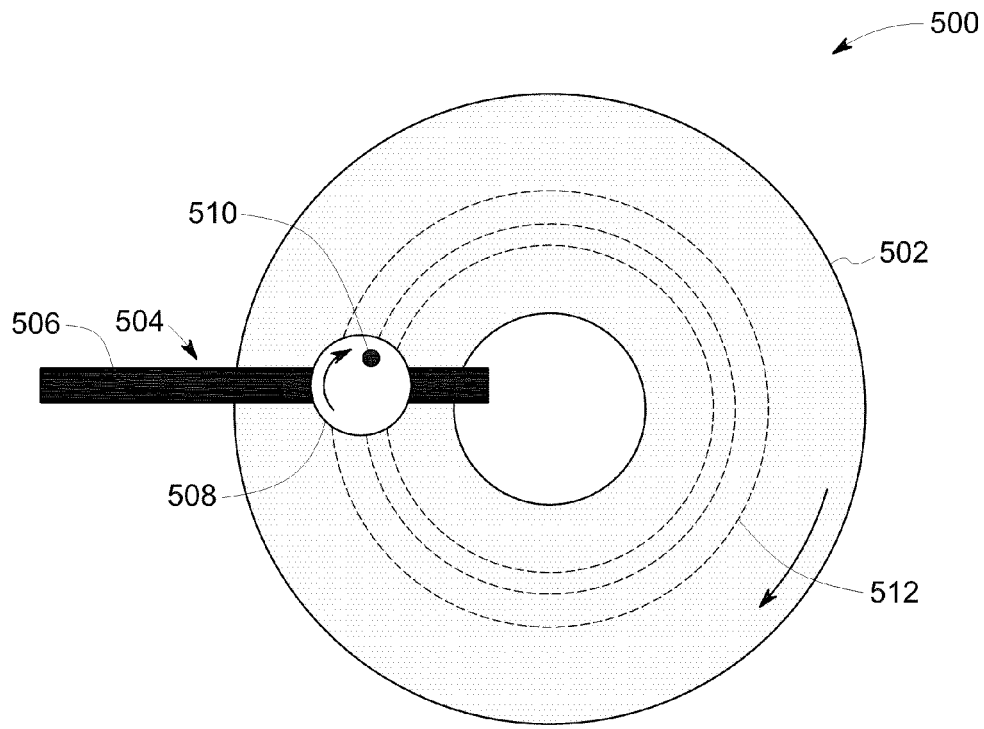
FIG. 7 is a system for processing information of a storage medium having a rotating module including multiple pick-up head devices in accordance with an embodiment of the present invention.

FIG. 7 is a system 500 (top view) for processing information of a storage medium 502 in accordance with an embodiment of the present invention. The system 500 includes a subsystem 504 having an arm 506 and a rotating module 508 arranged on the arm 504. The rotating module 508 includes one or more pick-up head devices 510 for directing a laser beam to a spot focus or line focus or multiple focal points for readout and recording of multiple data tracks 512. The storage medium 502 may be a circular disc shaped holographic storage medium having the multiple data tracks 512 with multiple volumes containing micro-holograms. The multiple volumes are arranged along the multiple data tracks 512 in multiple vertically stacked, laterally extending layers of the holographic storage medium, wherein the presence or absence of a micro-hologram in each of the volumes is indicative of a corresponding portion of data stored. Further, the rotating module 508 is a rapidly spinning device that may rotate faster than the storage medium 502, thereby covering multiple data tracks 512. The rotating module 508 is also capable of radially moving on the storage medium 502 while spinning in order to cover/read the entire the storage medium 502. This enables rapid readout and recording of data of the storage medium 502. In one embodiment, the system 500 may allow very slow rotation of a data disk or the storage medium 502 and record the data tracks at one-fourth rate of usual rotating speed of the data disk (one-fourth circles or less) perpendicular to a normal recording direction. This arrangement of the rotating module 508 having multiple pick-up heads may be similar to a helical scanning video tape (DAT etc.) and may produce a higher transfer rate when the rotating module 508 rotates at a higher speed relative to the disk or storage medium than the disk can rotate with respect to the pick-up head in a conventional setup.

It is to be understood that the above-mentioned embodiments of multiple pick-up heads or a multiple laser beams may be generalized to simultaneously address multiple layers in a holographic storage disc. Further, it is to be noted that the 'multiple data tracks' also refers to data tracks in various layers of the holographic storage disc. Furthermore, various embodiments may include optimization in the usage of various multiple pick-up heads in multiple layers, thereby reducing the burden on optical components and zooming range for aberration-compensated operation leading to reduced complexity and cost. It is to be also understood that the above-mentioned embodiments may be generalized to multiple disks or data storage mediums. In a non-limiting example, a system for processing information may include multiple disks or data storage mediums having one pick-up head per disk or data storage medium. The pick-up heads may be arranged or optimally spaced such that a constant data transfer rate is obtained from the system. In one embodiment, the above-mentioned embodiments can be used for any data storage medium such as BD or DVD or CD.

Figure 8:
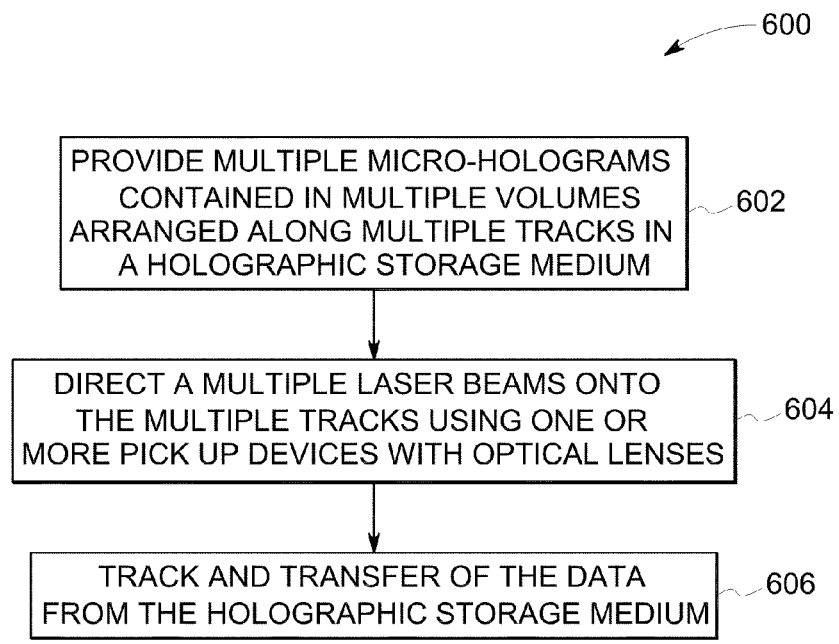
FIG. 8 is a method for recording and retrieving information in accordance with an embodiment of the present invention.

FIG. 8 is a method 600 for recording and retrieving information in accordance with an embodiment of the present invention. At step 602, the method includes providing multiple micro-holograms contained in multiple volumes arranged along multiple tracks in a holographic storage medium. At step 604, the method includes directing a multiple laser beams onto the multiple tracks using one or more pick up devices with optical lenses. The one or more pick-up head device is configured to record and verify the data synchronously or asynchronously. Such pick-up head devices are also movable to adjacent tracks or multiple track groups in the holographic storage medium. Further, at step 606, the method includes tracking and transferring of the data from the holographic storage medium. The tracking and transferring includes reading and writing the data stored in the holographic storage medium using a subsystem having an arrangement of the one or more pick-up head devices. Further, in one embodiment, the subsystem may include multiple bars arranged at less than about 180 degrees apart in a circular disc-shaped holographic storage data. Each of the bar may have multiple pick-up heads, thus, enabling a high data transfer rate during readout and recording.

Advantageously, the present system and method of transferring data stored in holographic storage medium enables retrieving and recording of data at a high rate. In one embodiment, the present technique incorporates the use of multiple pick-up heads moving on to a same track for recording and verifying the immediate recorded data. In another embodiment, the present technique incorporates the use of dual pick-up heads to maintain an overall constant maximum rotation speed of the storage medium. The present invention also overcomes the difficulty of focusing multiple beams from one pick-up head onto adjacent data tracks and ensures use of processing interleaved data track groups by spacing the laser beams from about two to about three tracks apart. The present technique can also be efficiently incorporated in a system having multiple holographic storage mediums being processed by the use of one or more pick-up heads for readout or recording of each holographic storage medium.

Another advantage of the present technique includes eliminating the seek time of a pick-up head device. A non-limiting example of such advantage in an application of the present system includes the use of two pick-up head devices (say pick-up head device A and pick-up head device B) wherein one pick-up head device seeks while the other pick-up head device reads the data of the storage medium. At first step, the pick-up head devices A, B seeks for data track followed by reading the data track. While the pick-up head device A continues reading, the other pick-up head device B seeks in preparation for a track jump. Thereafter, the pick-up head device B starts reading the new data track while pick-up head jumps in a parallel track for seeking and reading.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for processing information, comprising:
a plurality of micro-holograms contained in a plurality of volumes arranged along a plurality of tracks in one or more storage mediums, each said micro-hologram comprises a data;
a plurality of pick-up head devices with optical lenses for directing laser beams on the plurality of tracks; and
a subsystem for arranging the plurality of pick-up head devices wherein the plurality of pick-up head devices are configured for simultaneous recording, retrieving, or combination thereof of data of two or more micro-holograms contained in the one or more storage mediums.

2. The system of claim 1, wherein the one or more storage mediums comprises a circular disc-shaped holographic storage medium or a DVD or a CD.

3. The system of claim 2, wherein the subsystem comprises a slider bar allowing radial movement of the plurality of pick-up head devices in the circular disc-shaped holographic storage medium.

4. The system of claim 3, wherein the subsystem allows parallel movement of the plurality of pick-up head devices for obtaining a constant data transfer rate and maintaining a constant angular velocity of rotation of the circular disc-shaped holographic storage medium.

5. The system of claim 1, wherein one pick-up head is arranged at each of the storage medium, the pick-up head at each of the storage medium are optimally spaced with respect to each other for obtaining a constant data transfer rate.

6. The system of claim 1, wherein the subsystem allows at least one pick-up head device to move from centre to periphery of the one or more storage mediums.

7. The system of claim 1, wherein the subsystem allows at least one pick-up head device to move from periphery to centre of the one or more storage mediums.

8. The system of claim 1, wherein one or more of the plurality of pick up head devices directs the laser beams to a spot focus or a line focus in the one or more storage mediums.

9. The system of claim 8, wherein the one or more of the plurality of pick up head devices comprises a cylindrical lens for directing the laser beam to the line focus in the one or more storage mediums.

10. The system of claim 9, wherein the line focus covers a plurality of parallel tracks in the one or more storage mediums.

11. The system of claim 1, wherein the system comprises the plurality of pick up head devices having a plurality of cylindrical lens for focusing the laser beam to line spots.

12. The system of claim 1, wherein the plurality of pick-up head devices comprise grating subsystems for directing the laser beam to a plurality of focal points covering a plurality of tracks in the one or more storage mediums.

13. The system of claim 11, wherein the system comprises the plurality of pick-up head devices having grating subsystems for directing the laser beam to a plurality of focal points covering the plurality of tracks in the one or more storage mediums.

14. The system of claim 13, wherein at least one of the grating subsystems is a diffractive grating.

15. The system of claim 1, wherein the plurality of pick-up head devices comprise a plurality of optical lenses for generating a plurality of line focus or spot focus covering a plurality of tracks in the one or more storage mediums.

16. The system of claim 3, wherein the subsystem comprises a rotating module movable on an arm along the radial direction of the circular disc-shaped holographic storage medium, said module comprising the plurality of pick-up head devices for covering a plurality of tracks.

17. A method for recording and retrieving information, comprising:
providing a plurality of micro-holograms contained in a plurality of volumes arranged along a plurality of tracks in a holographic storage medium, said micro-holograms comprises a data;
directing a plurality of laser beams onto the plurality of tracks using a plurality of pick up devices with optical lenses; and
simultaneous recording, retrieving, or combination thereof of data of two or more micro-holograms contained in the holographic storage medium.

18. The method of claim 17, wherein the tracking and transferring comprises reading and writing the data stored in the holographic storage medium using a subsystem having an arrangement of the plurality of pick-up head devices.

19. The method of claim 17, wherein the plurality of pick-up head devices move to a common track in the holographic storage medium and further configured for recording and verifying the data synchronously or asynchronously.

20. The method of claim 17, wherein the plurality of pick-up head devices are movable to adjacent tracks or a plurality of track groups in the holographic storage medium.

21. The method of claim 17, wherein the method further comprises seeking and readout of the data from the holographic storage medium using a first pick-up head device and a second pick-up head device among the plurality of pick-up head devices, followed by seeking in preparation for a data track jump by the second pick-up head device during the readout of the data by the first pick-up head device and further followed by readout of the data by the second pick-up head device on a new data track and jumping onto another parallel data track by the first pick-up head device for readout respectively.

22. The method of claim 17, wherein the subsystem comprises a plurality of bars arranged at less than about 180 degrees apart in a circular disc-shaped holographic storage data, said bars are provided with the plurality of pick-up head devices.

23. The system of claim 1, wherein the plurality of pick-up head devices are configured for simultaneous recording, retrieving, or combination thereof of data of two or more micro-holograms contained in the plurality of volumes arranged along two or more tracks.

24. A system for processing information, comprising:
a plurality of micro-holograms contained in a plurality of volumes arranged along a plurality of tracks in one or more storage mediums, each said micro-hologram comprises a data;
a plurality of pick-up head devices with optical lenses for directing laser beams on the plurality of tracks; and
a subsystem for arranging the plurality of pick-up head devices wherein the plurality of pick-up head devices are configured for simultaneous recording, retrieving, or combination thereof of data of two or more micro-holograms contained in the one or more storage mediums,
wherein the plurality of pick up head devices comprise a plurality of cylindrical lens for focusing the laser beam to line spots.

25. A system for processing information, comprising:
a plurality of micro-holograms contained in a plurality of volumes arranged along a plurality of tracks in one or more storage mediums, each said micro-hologram comprises a data;

a plurality of pick-up head devices with optical lenses for directing laser beams on the plurality of tracks; and a subsystem for arranging the plurality of pick-up head devices wherein the plurality of pick-up head devices are configured for simultaneous recording, retrieving, or combination thereof of data of two or more micro-holograms contained in the one or more storage mediums, wherein the plurality of pick up head devices comprise a plurality of cylindrical lens for focusing the laser beam to line spots, wherein the plurality of the pick-up head devices comprise a plurality of grating subsystems for directing the laser beam to a plurality of focal points covering the plurality of tracks in the one or more storage mediums.

26. The system of claim 25, wherein one or more of the plurality of grating subsystems is a diffractive grating.

27. A system for processing information, comprising:
a plurality of micro-holograms contained in a plurality of volumes arranged along a plurality of tracks in one or more storage mediums, each said micro-hologram comprises a data;
one or more pick-up head devices with optical lenses for directing laser beams on the plurality of tracks; and
a subsystem for arranging the one or more pick-up head devices wherein the one or more pick-up head devices are configured for simultaneous recording, retrieving, or combination thereof of data of two or more micro-holograms contained in the one or more storage mediums,
wherein the one or more storage mediums comprises a circular disc-shaped holographic storage medium or a DVD or a CD, wherein the subsystem comprises a slider bar allowing radial movement of the one or more pick-up head devices in the circular disc-shaped holographic storage medium, wherein the subsystem comprises a rotating module movable on an arm along the radial direction of the circular disc-shaped holographic storage medium, said module comprising the one or more pick-up head devices for covering a plurality of tracks.

28. A method for recording and retrieving information, comprising:
providing a plurality of micro-holograms contained in a plurality of volumes arranged along a plurality of tracks in a holographic storage medium, said micro-holograms comprises a data;
directing a plurality of laser beams onto the plurality of tracks using one or more pick up devices with optical lenses; and
simultaneous recording, retrieving, or combination thereof of data of two or more micro-holograms contained in the holographic storage medium,
wherein the one or more pick-up head devices move to a common track in the holographic storage medium and further configured for recording and verifying the data synchronously or asynchronously.

29. A method for recording and retrieving information, comprising:
providing a plurality of micro-holograms contained in a plurality of volumes arranged along a plurality of tracks in a holographic storage medium, said micro-holograms comprises a data;
directing a plurality of laser beams onto the plurality of tracks using a plurality of pick up devices with optical lenses; and
simultaneous recording, retrieving, or combination thereof of data of two or more micro-holograms contained in the holographic storage medium,
wherein the method further comprises seeking and readout of the data from the holographic storage medium using a first pick-up head device and a second pick-up head device among the plurality of pick up devices, followed by seeking in preparation for a data track jump by the second pick-up head device during the readout of the data by the first pick-up head device and further followed by readout of the data by the second pick-up head device on a new data track and jumping onto another parallel data track by the first pick-up head device for readout respectively.

30. A method for recording and retrieving information, comprising:
providing a plurality of micro-holograms contained in a plurality of volumes arranged along a plurality of tracks in a holographic storage medium, said micro-holograms comprises a data;
directing a plurality of laser beams onto the plurality of tracks using a plurality of pick up devices with optical lenses; and
simultaneous recording, retrieving, or combination thereof of data of two or more micro-holograms contained in the holographic storage medium,
wherein a subsystem comprises a plurality of bars arranged at less than about 180 degrees apart in a circular disc-shaped holographic storage data, said bars are provided with the plurality of pick-up head devices.

* * * * *